US011980906B2

(12) United States Patent
Cai

(10) Patent No.: US 11,980,906 B2
(45) Date of Patent: May 14, 2024

(54) DECORATIVE FIREPIT WITH FOUNTAIN FEATURE

(71) Applicant: Natures Mark, LLC, Fullerton, CA (US)

(72) Inventor: Milla Cai, Xiamen (CN)

(73) Assignee: Natures Mark, LLC, Fullerton, CA (US)

(*) Notice: Subject to any disclaimer, the term of this patent is extended or adjusted under 35 U.S.C. 154(b) by 77 days.

(21) Appl. No.: 17/581,270

(22) Filed: Jan. 21, 2022

(65) Prior Publication Data

US 2023/0234090 A1 Jul. 27, 2023

(51) Int. Cl.
*B05B 17/08* (2006.01)
*F23D 14/28* (2006.01)
*F23Q 3/00* (2006.01)

(52) U.S. Cl.
CPC .............. *B05B 17/08* (2013.01); *F23D 14/28* (2013.01); *F23Q 3/002* (2013.01); *F23D 2207/00* (2013.01); *F23D 2208/00* (2013.01)

(58) Field of Classification Search
CPC ..... B05B 17/08; F23D 14/28; F23D 2207/00; F23D 2208/00; F23Q 3/002
USPC ......................................... 239/17, 18, 20, 23
See application file for complete search history.

(56) References Cited

U.S. PATENT DOCUMENTS 3,104,814 A * 9/1963 Boerder .................. B05B 17/08 431/278
D384,779 S 10/1997 Krause
5,992,757 A * 11/1999 Smith ..................... B05B 17/08 239/20
6,443,364 B1 * 9/2002 Lin ......................... F21V 35/00 239/18
6,769,906 B1 8/2004 Grove et al.
D603,037 S 10/2009 DeFouw et al.
7,690,585 B1 * 4/2010 Johns .................... B05B 17/085 99/452
D698,908 S 2/2014 Krieger
D848,591 S 5/2019 Wheeler et al.
10,588,456 B2 3/2020 Jenkins
2003/0201336 A1 * 10/2003 Rumens .................... F21S 8/00 239/17
2008/0308645 A1 * 12/2008 Presley ................... F23D 14/20 29/428
2014/0008455 A1 * 1/2014 Muff ....................... F23D 14/20 239/17
2021/0247062 A1 * 8/2021 Di Domenico ....... F21S 10/002

* cited by examiner

*Primary Examiner* — Christopher S Kim

(74) *Attorney, Agent, or Firm* — Whitaker Chalk Swindle & Schwartz, PLLC; Charles D. Gunter, Jr.

(57) ABSTRACT

A combination firepit and water fountain having a fountain base with an opening in a top surface of the base. A circumferential ignition coil is located within the opening and is connected by a fuel supply line to a source of gaseous fuel for providing a fire. A circumferential flameproof enclosure surrounds the ignition coil in the top opening of the base. A fountain top is also located centrally within the top opening so that the flameproof enclosure surrounds and circumscribes the fountain top. A water pump located in the base supplies a water flow out the fountain top and down the sides thereof into the interior of the fountain base, where it is recirculated.

4 Claims, 5 Drawing Sheets

DECORATIVE FIREPIT WITH FOUNTAIN FEATURE

BACKGROUND OF THE INVENTION

1. Field of the Invention

The present invention relates to a decorative gas fire pit which also has an integrated water fountain as a part of the overall design.

2. Description of the Prior Art

Gas firepits, particularly outdoor gas firepits, bring the warmth and ambiance of a fireplace to a person's patio, deck or backyard. Many people see the outdoor firepit as a must have choice to extend outdoor time during the cold winter months. Firepits also make a nice gathering place for gathering and talking with friends. Many of the available firepits have on the order of a 40,000-50,000 BTU heat output, providing ample warmth while creating a warm and romantic bonfire type atmosphere in winter, perfectly matching every outdoor space.

While most people think of their backyards, patios or other outdoor areas for installing firepits, in some cases, they can be installed inside an enclosed space, such as a dwelling space as well. A number of inside and outside gas firepit designs are commercially available at the present time which include bodies which conceal the fuel source, such as a propane tank, making them attractive center pieces, much like furniture items. It is possible to enjoy all of the ambiance of a classic fire without the mess of tending ashes. They are ideal at adding ambiance and comfort to a chilly winter night where friends and family members gather and enjoy each other's company.

The following issued Design Patents are intended to be exemplary of the general state of the art in the area of gas firepit design: D698,908, issued Feb. 4, 2014, to Krieger et al.; D848,591, issued May 4, 2019, to O'Brien et al.; D723,147, issued Feb. 24, 2015, to Lawrence et al.; and D801,513, issued Oct. 31, 2017, to Burlingham. These referenced patents are intended to merely be exemplary of the present gas firepit art without being intended as limiting of the present invention.

Despite the advances which have been made in the field of gas firepits, there continues to exist a need for further improvements and innovations. For example, one aspect of having a gas firepit operating within an enclosed area is that the burning action may tend to dry out the surrounding air. It would be an advantage in many of these situations to be able to mitigate the effect of dry air by introducing a source of water or moisture into the surrounding air.

One advantage of introducing moisture into the environment, as by the presence of a water fountain, is that in addition to increasing the humidity, the fountain often also provides the soothing sound of running or falling water. These types of sounds are relaxing to most people.

Additional needs exist which will be addressed by the features of the present design, which features will be more fully described in the written description which follows.

SUMMARY OF THE INVENTION

An overall object of the present invention is to provide an article of manufacture which overcomes certain of the disadvantages of the present gas firepit designs commercially available at the present time, as have been discussed.

This object is accomplished by providing an improved firepit design which features an integrated water fountain that not only adds esthetically to the design but also functions to add moisture to the environment of the firepit, while the firepit is operating, to keep the surrounding air from becoming too dry.

The gas firepit of the invention will provide a warm focal point for patio conversation and the like. The heat from the firepit will provide an extended time for gathering with friends on a brisk fall evening. The stylish firepit design boasts a powerful 50,000 BTU heat output—perfect for keeping your family toasty on brisk nights while allowing your guests to enjoy its welcoming ambiance throughout the chilly seasons. The firepit can also be incorporated into an interior design for use within enclosed dwellings and other closed spaces.

In one version of the invention, the combination firepit and water fountain of the invention features a polygonally-shaped fountain base having opposing sidewalls, a bottom wall surface and a top wall surface, the top wall surface having a central opening therein. A circumferential ignition coil having an interior and an exterior is located within the opening in the top wall surface of the fountain base, the ignition coil being connected by a fuel supply line to a source of gaseous fuel. A circumferential flameproof enclosure is also located within the opening in the top wall surface of the fountain base, the flameproof enclosure being arranged in the top opening of the fountain base so that the ignition coil surrounds and circumscribes the flameproof enclosure.

A decorative fountain top is located centrally within the opening in the top wall surface of the fountain base within a defined circumference of the flameproof enclosure, so that the flameproof enclosure surrounds and circumscribes the fountain top. A water pump is located within the fountain base and has a water outlet for providing a water flow to the fountain top and a water inlet for receiving used water for recirculation. The water pump is supplied with water in use to provide a circulating water flow out the fountain top and down the sides thereof into the interior of the fountain base, where it is recirculated.

An ignition control panel is located on one of the opposing sidewalls of the fountain base and has a gas supply control for controlling the flow of the gaseous fuel to the ignition coil and an igniter control in the form of a pulse ignition for supplying a spark ignition for igniting the gaseous fuel to provide a flame in the interior of the ignition coil.

In another version of the invention, the combination firepit and water fountain features a round fountain base. Otherwise, the operative features are the same as with the square base version.

In both versions of the fountain, the gaseous fuel which is supplied can be a liquified petroleum gas, such as a source of propane fuel, for example, supplied from a 20 lb. propane tank located adjacent the fountain. The decorative fountain top can assume various forms, such as a round globe or a cylindrical shape, to name two common shapes. The spark ignition which is provided as a part of the ignition control panel is preferably a piezo spark igniter having an igniter element located within the top opening of the fountain in the vicinity of the ignition coil.

Additional objects, features and advantages will be apparent in the written description which follows.

DETAILED DESCRIPTION OF THE INVENTION

In order to further describe the purpose of the present invention, the technical solution and advantages more clearly, the disclosure incorporates the accompanying drawings as well as the detailed description which follows. It should be understood, however, that the preferred embodiments described herein are merely for the better understanding of the present invention and the technical solution and should not be used to limit the present invention.

Figure 1:
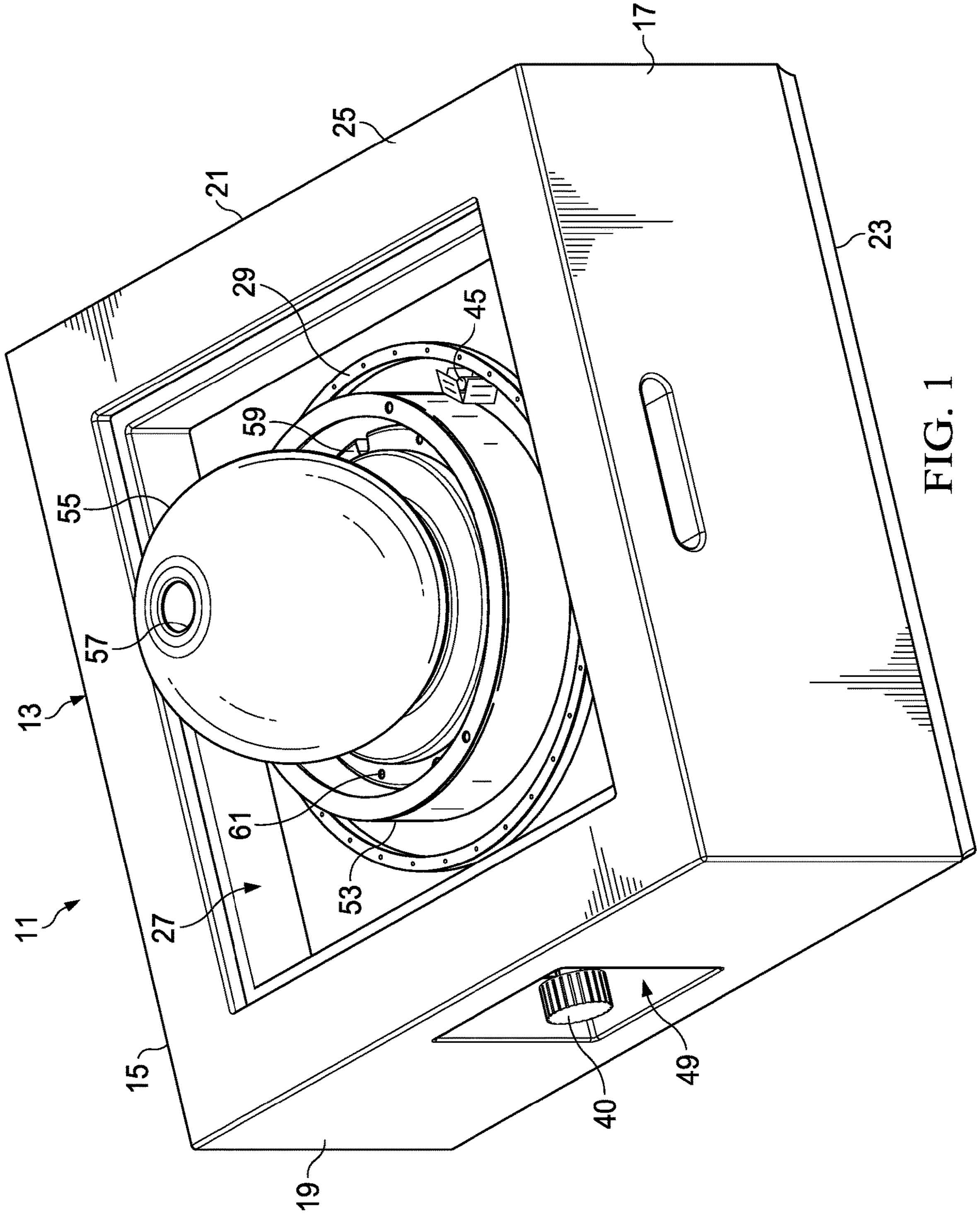
FIG. 1 is a perspective view of a square firepit/fountain design embodying the principles of the present invention.
Figure 2:
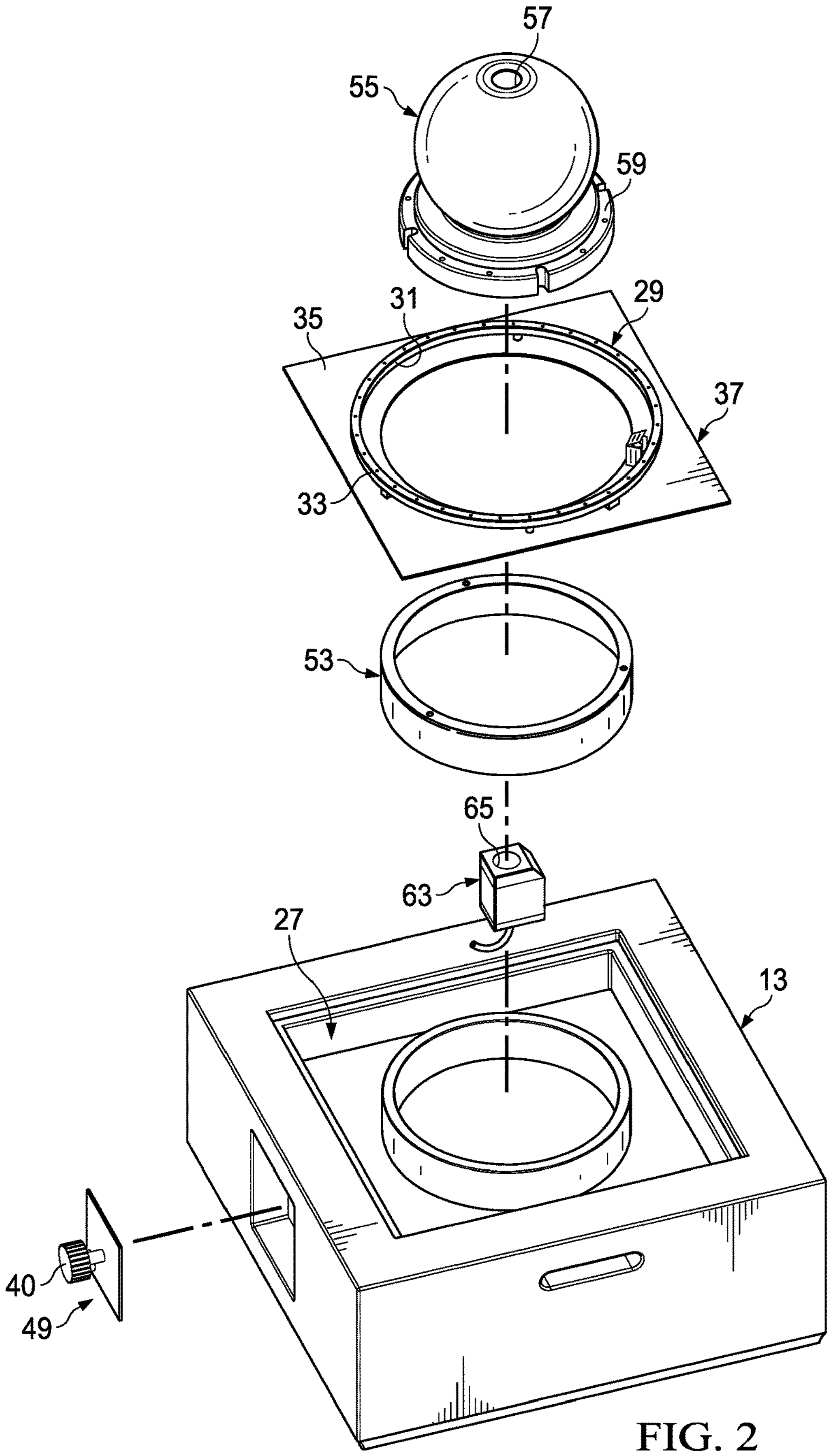
FIG. 2 is an exploded view of the device of FIG. 1, showing the component parts thereof.

FIGS. 1 and 2 depict the first embodiment of the invention in the form of a combination firepit and water fountain, designated generally as 11. The firepit/fountain 11 of FIG. 1 has a polygonally (in this case square) shaped base 13 having opposing sidewalls, 15, 17 and 19, 21. The base also has a bottom wall surface 23 and a top wall surface 25. The top wall surface 25 has an opening 27 centrally located therein. The fountain base 13 can be formed of any of a number of convenient materials, in this case a durable glazed polyresin, so that it is waterproof and rust-resistant.

A circumferential ignition coil 29 having an interior 31 and an exterior 33 (see FIG. 2) is located within the opening 27 in the top wall surface 25 of the fountain base 13 and is mounted on a support sheet 37. The ignition coil being connected by a fuel supply line to a source of gaseous fuel, as will be described more fully.

Figure 5:
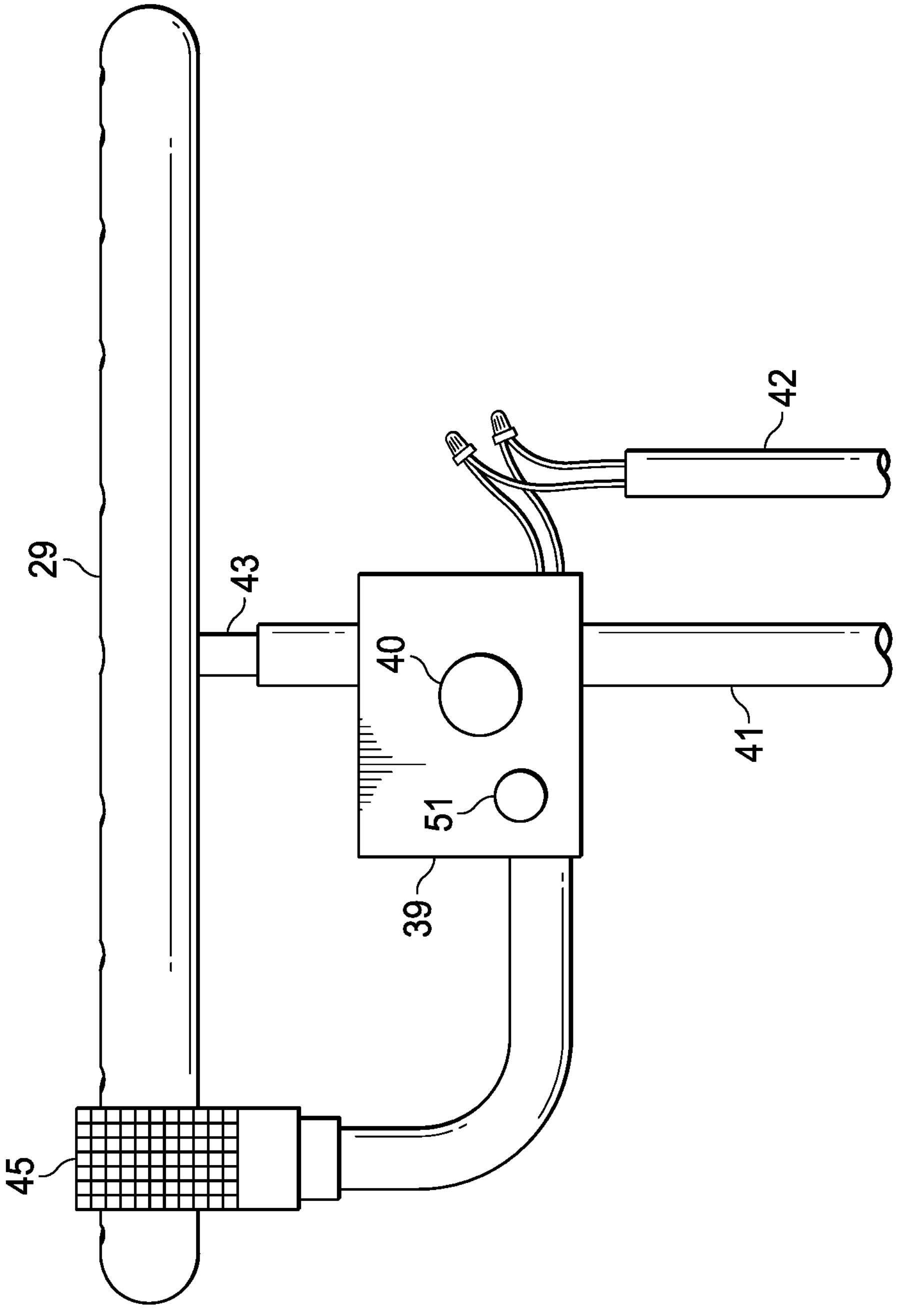
FIG. 5 is a simplified, partly schematic diagram of the ignition control panel and its operative components.

The exact configuration of the flame source can vary, but a simplified arrangement is shown partially schematically in FIG. 5. An ignition control box 39 controls the flow of gas (such as propane gas supplied from a storage tank) from a supply line 41 through an orifice 43 to the ignition coil 29. A small propane tank can be easily located within the enclosure, or adjacent to the fountain base. The control knob 40 on the fountain base is turned to allow the flow of gas to the firepit. The control box 39 also controls an electronic ignition can be powered from a mains circuit 42, or which in some cases is battery powered, with the battery being located behind or in the control box. When a push button 51 on the control box is depressed, this sends a small electric current to an ignition probe 45 that is mounted at one point on the periphery of the ignition coil 29. This action causes a spark which ignites the gas being supplied to the ignition coil and to the firepit. Turning the knob 40 to the closed position will extinguish the flames by stopping the flow of gas.

Spark ignition systems for gas firepits are well known in the industry and are commercially available from a number of sources. The ignition probe 45 may itself utilize, for example, a piezo spark igniter. Piezo spark igniters use a small force to strike an object such as a crystal which, in turn, creates a voltage to cause a spark. Quartz crystal is typically the material used to generate this spark.

Returning to FIG. 2, it can be seen that a circumferential flameproof enclosure 53 is also located within the opening 27 in the top wall surface 25 of the fountain base 13. The flameproof enclosure 53 is a ring-shaped object which is arranged in the top opening 27 of the fountain base so that the ignition coil 29 surrounds and circumscribes the flameproof enclosure. The flameproof enclosure 53 can be formed of a ceramic or other flameproof material which protects the additional water fountain components of the assembly.

In the version of the invention shown in FIGS. 1 and 2, a decorative fountain top 55 is located centrally within the opening 27 in the top wall surface of the fountain base within a defined circumference of the flameproof enclosure 53, so that the flameproof enclosure 53 surrounds and circumscribes the fountain top. As seen in FIGS. 1 and 2, the decorative top 55 is, in this case, a round glass or plastic globe having a top opening 57. The globe 57 is mounted on a mounting flange 59 having a series of circumferentially spaced holes 61 (FIG. 1) in the version of the invention shown in FIGS. 1 and 2.

A water pump (63 in FIG. 2) is located within the fountain base 13 and has a water outlet 65 for providing a water flow to the fountain top 55 and a water inlet (not shown) for receiving used water for recirculation. The water pump 65 is supplied with water in use to provide a circulating water flow out the fountain top and down the sides thereof into the interior of the fountain base, where it is recirculated. This can be accomplished by plumbing the water outlet 65 from the pump 63 to supply water to the interior of the globe 55, where it then passes out the opening 57 and flows down the sides of the globe 55. The water then enters the drain holes 61 in the mounting flange 59 of the globe and is captured to be recirculated by the water pump 65. It is not necessary to plumb the water pump to an outside water source if water is supplied to the fountain prior to use by simply pouring water into the top opening.

Figure 3:
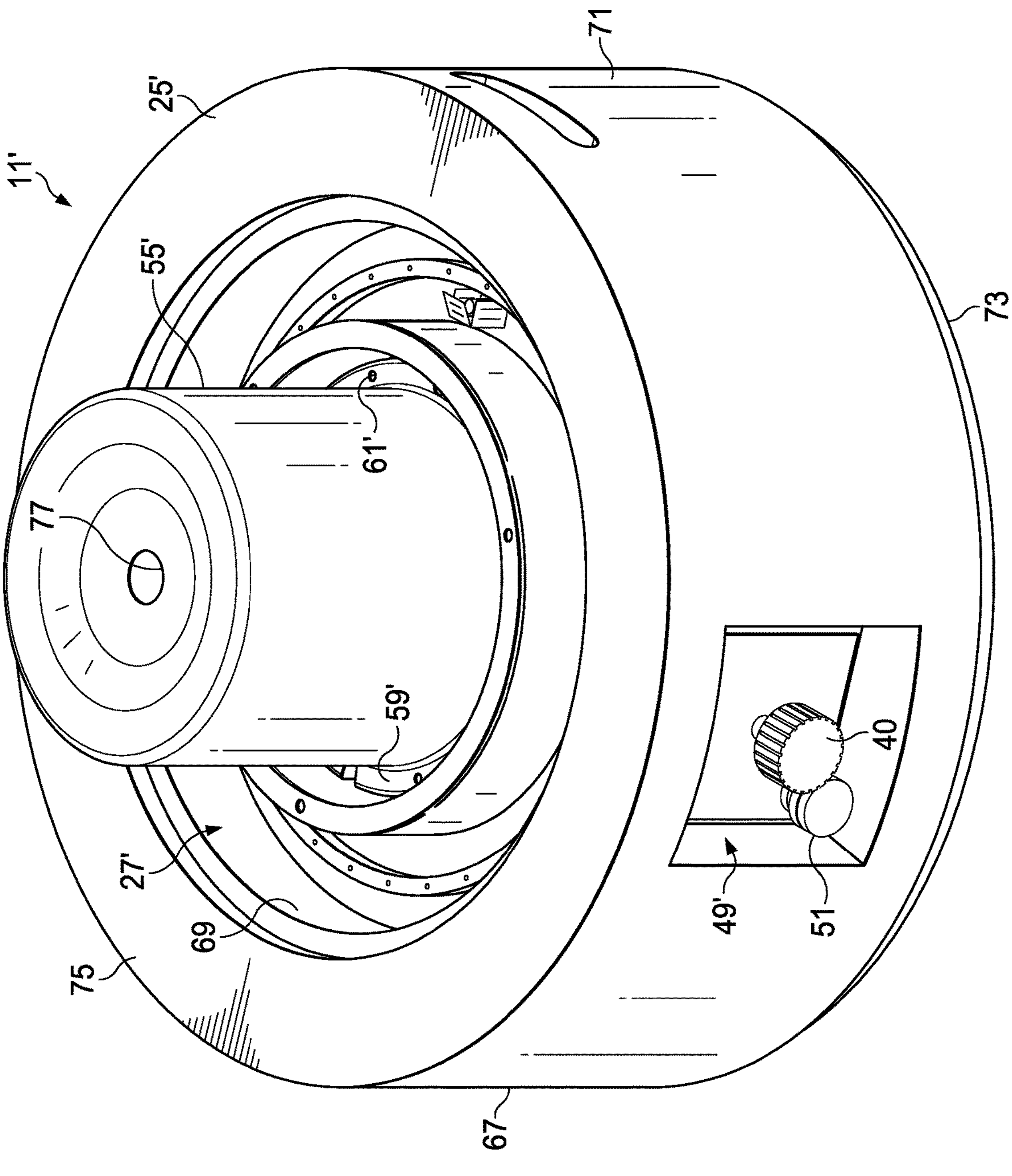
FIG. 3 is a perspective view, similar to FIG. 1, of a round firepit/fountain of the invention.
Figure 4:
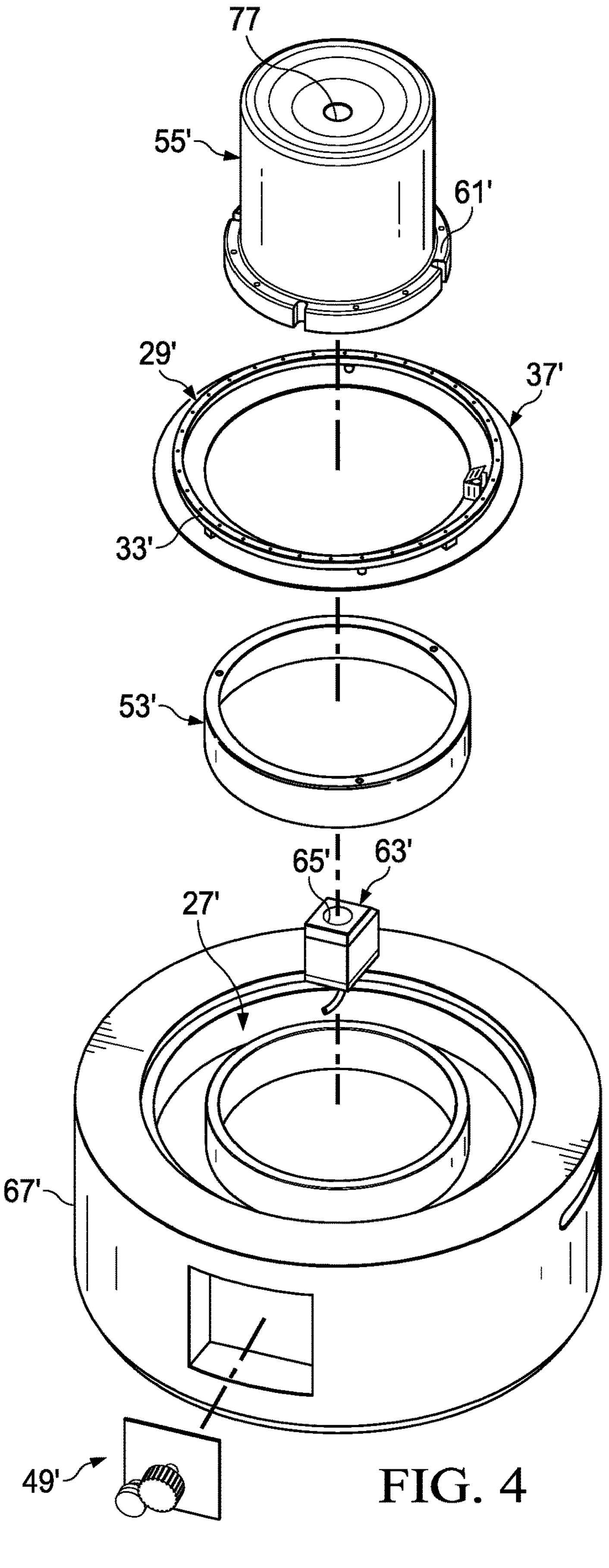
FIG. 4 is an exploded view, similar to FIG. 2, showing the components of the round version of the firepit/fountain of the invention.

FIGS. 3 and 4 illustrate another embodiment of the invention which features a round fountain base, designated generally as 67. The round-shaped fountain base 67 having an interior sidewall 69, an exterior sidewall 71, a bottom wall surface 73, and a top wall surface 75, the top wall surface 75 having a central opening therein. The components of the combination firepit and water fountain shown in FIGS. 3 and correspond generally to the same components previously described with respect to FIGS. 1 and 2. They have accordingly been numbered the same, except with primes to designate the same components.

One difference in the embodiment of the invention shown in FIG. 3 is that the decorative fountain top 55" which is located centrally within the opening in the top wall surface of the fountain base is, in this case, a cylindrically shaped body. The cylindrically shaped outer body has a central opening 77 in the top thereof, through which water flows from the water pump 63', as has been described with respect to FIGS. 1 and 2. The water flows over the sides of the decorative fountain top and enters the drain holes 61' where it is recirculated, as previously described.

An invention has been provided with several advantages. The firepit can be equipped with a power heat output, on the order of 50,000 BTU, or more. It delivers a clean, smokeless fire. The firepit can be fueled by a convenient fuel source, such as by a standard 20 lb. propane gas tank. The control panel provides pulse ignition and flame adjustment. The fully equipped firepit comes equipped with lava rocks and can be provided with a protective cover.

The water fountain portion of the combination firepit and water fountain is easy to operate, just needing the addition of water and plugging in a power cord. It is constructed from durable glazed polyresin, so that it is weatherproof and rust-resistant. The fountain provides a relaxing tinkling sound of running water.

Both the firepit and the water fountain portions of the design work independently without interfering with each other. The multifunctional aspect of the design improves cost performance. The firepit provides comfortable warmth, while the water fountain prevents the air from becoming too dry.

The above described embodiment of the invention is a preferred embodiment only. It will be understood by those skilled in the relevant arts that various changes and modifications can be made which do not deviate from the premise of the present invention. A number of improvements and transformations can be made, and these improvements and transformation should not be considered as being outside the scope of protection of the present invention.

What is claimed is:

1. A combination firepit and water fountain, the combination comprising:

a polygonally-shaped fountain base having an interior defined by opposing sidewalls, a bottom wall surface and a top wall surface, the top wall surface having a central opening therein;

a circumferential ignition coil having an ignition coil interior and an ignition coil exterior located within the opening in the top wall surface of the fountain base, the ignition coil being connected by a fuel supply line to a source of gaseous fuel;

a circumferential flameproof enclosure also located within the opening in the top wall surface of the fountain base, the flameproof enclosure being arranged within the opening in the top wall surface of the fountain base so that the ignition coil surrounds and circumscribes the flameproof enclosure;

a decorative fountain top located centrally within the opening in the top wall surface of the fountain base within a defined circumference of the flameproof enclosure, so that the flameproof enclosure surrounds and circumscribes the fountain top;

a water pump located within the fountain base and having a water outlet for providing a water flow to the fountain top and a water inlet for receiving used water for recirculation, the water pump being supplied with water in use to provide a circulating water flow out the fountain top and down the sides thereof into the interior of the fountain base, where it is recirculated; and an ignition control panel having a gas supply control for controlling the flow of the gaseous fuel to the ignition coil and an igniter control for supplying a spark ignition for igniting the gaseous fuel to provide a flame in the ignition coil interior; and wherein the decorative fountain top is shaped as a round globe.

2. A combination firepit and water fountain, the combination comprising:

a polygonally-shaped fountain base having an interior defined by opposing sidewalls, a bottom wall surface and a top wall surface, the top wall surface having a central opening therein;

a circumferential ignition coil having an ignition coil interior and an ignition coil exterior located within the opening in the top wall surface of the fountain base, the ignition coil being connected by a fuel supply line to a source of gaseous fuel;

a circumferential flameproof enclosure also located within the opening in the top wall surface of the fountain base, the flameproof enclosure being arranged within the opening in the top wall surface of the fountain base so that the ignition coil surrounds and circumscribes the flameproof enclosure;

a decorative fountain top located centrally within the opening in the top wall surface of the fountain base within a defined circumference of the flameproof enclosure, so that the flameproof enclosure surrounds and circumscribes the fountain top;

a water pump located within the fountain base and having a water outlet for providing a water flow to the fountain top and a water inlet for receiving used water for recirculation, the water pump being supplied with water in use to provide a circulating water flow out the fountain top and down the sides thereof into the interior of the fountain base, where it is recirculated; and an ignition control panel having a gas supply control for controlling the flow of the gaseous fuel to the ignition coil and an igniter control for supplying a spark ignition for igniting the gaseous fuel to provide a flame in the ignition coil interior; and wherein the spark ignition provided as a part of the ignition control panel is a piezo spark igniter having an igniter element located within the top opening of the fountain.

3. A combination firepit and water fountain, the combination comprising:

a round-shaped fountain base having an interior defined by an interior sidewall, an exterior sidewall, a bottom wall surface and a top wall surface, the top wall surface having a central opening therein;

a circumferential ignition coil having an ignition coil interior and an ignition coil exterior located within the opening in the top wall surface of the fountain base, the ignition coil being connected by a fuel supply line to a source of gaseous fuel;

a circumferential flameproof enclosure also located within the opening in the top wall surface of the fountain base, the flameproof enclosure being arranged within the opening in the top wall surface of the fountain base so that the ignition coil surrounds and circumscribes the flameproof enclosure;

a decorative fountain top located centrally within the opening in the top wall surface of the fountain base within a defined circumference of the flameproof enclosure, so that the flameproof enclosure surrounds and circumscribes the fountain top;

a water pump located within the fountain base and having a water outlet for providing a water flow to the fountain top and a water inlet for receiving used water for recirculation, the water pump being supplied with water in use to provide a circulating water flow out the fountain top and down the sides thereof into the interior of the fountain base, where it is recirculated; and an ignition control panel having a gas supply control for controlling the flow of the gaseous fuel to the ignition coil and an igniter control for supplying a spark ignition for igniting the gaseous fuel to provide a flame in the ignition coil interior; and wherein the decorative fountain top is cylindrically-shaped tube having a top tube opening at an outermost end thereof.

4. The combination firepit and water fountain of claim 3, wherein the spark ignition provided as a part of the ignition control panel is a piezo spark igniter having an igniter element located within the top opening of the fountain.

* * * * *